United States Patent
Heeren

(10) Patent No.: US 8,427,334 B2
(45) Date of Patent: Apr. 23, 2013

(54) DEVICE FOR EARLY REGISTRATION OF A CLOSING STATE OF A CLOSURE ELEMENT FOR A COMPARTMENT OPENING

(75) Inventor: Jens Heeren, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 312 days.

(21) Appl. No.: 12/862,248

(22) Filed: Aug. 24, 2010

(65) Prior Publication Data

US 2011/0050445 A1 Mar. 3, 2011

Related U.S. Application Data

(60) Provisional application No. 61/236,747, filed on Aug. 25, 2009.

(30) Foreign Application Priority Data

Aug. 25, 2009 (DE) .......................... 10 2009 038 781

(51) Int. Cl.
*G08B 21/00* (2006.01)
*B64C 1/14* (2006.01)
*E05F 15/20* (2006.01)
*E05B 53/00* (2006.01)

(52) U.S. Cl.
USPC .................. 340/686.6; 244/129.4; 244/129.5; 49/31; 70/265

(58) Field of Classification Search .................. None
See application file for complete search history.

(56) References Cited

U.S. PATENT DOCUMENTS

| | | | |
|---|---|---|---|
| 4,453,684 A * | 6/1984 | Hanks | 244/129.5 |
| 4,680,891 A | 7/1987 | Perkins | |
| 4,720,065 A * | 1/1988 | Hamatani | 244/129.5 |
| 5,063,371 A * | 11/1991 | Oyer et al. | 340/541 |
| 6,109,563 A | 8/2000 | Verhoeven et al. | |
| 6,467,729 B2 | 10/2002 | Buchs et al. | |
| 6,547,185 B2 | 4/2003 | Erben et al. | |
| 2008/0210823 A1* | 9/2008 | Toboso et al. | 244/129.5 |
| 2009/0109048 A1* | 4/2009 | Spivak et al. | 340/686.6 |
| 2009/0157235 A1 | 6/2009 | Stebbins et al. | |
| 2010/0001136 A1* | 1/2010 | Wilson et al. | 244/129.5 |
| 2010/0024305 A1* | 2/2010 | Kim et al. | 49/208 |

FOREIGN PATENT DOCUMENTS

DE 10037621 A1 2/2002

OTHER PUBLICATIONS

German Office Action dated Aug. 16, 2011 for German Application No. 102009038781.1.

* cited by examiner

*Primary Examiner* — George Bugg
*Assistant Examiner* — Renee Dorsey
(74) *Attorney, Agent, or Firm* — Ingrassia Fisher & Lorenz P.C.

(57) ABSTRACT

A device is provided for early registering of the closing state of a closure element for a compartment opening includes, but is not limited to an inductive proximity sensor, a measuring plate and a movement path guide. By means of the movement path guide the measuring plate is guided parallel to the proximity sensor from a predetermined degree of closing to complete closure of the closure element. In this manner a precise early statement relating to the imminent closure of the closure element can be made, for example in order to activate a locking mechanism.

8 Claims, 3 Drawing Sheets

DEVICE FOR EARLY REGISTRATION OF A CLOSING STATE OF A CLOSURE ELEMENT FOR A COMPARTMENT OPENING

CROSS REFERENCE TO RELATED APPLICATIONS

This application claims priority to German Patent Application No. 10 2009 038 781.1 filed Aug. 25, 2009 and also claims priority to U.S. Provisional Patent Application No. 61/236,747 filed Aug. 25, 2009, the disclosures of which are hereby incorporated herein by reference in their entirety.

TECHNICAL FIELD

The invention relates to a device for the early registration of a closing state of a closure element for a compartment opening. The invention further relates to a vehicle with an interior space that can be closed by means of a pivotable door, and a closure device for the early acquisition of the closing state of the door. Furthermore, the invention relates to the use of a device for the early acquisition of the closing state of a closure element for a compartment opening on an aircraft, as well as to an aircraft comprising at least one cargo compartment, a cargo compartment opening, a cargo-compartment opening frame, and a cargo compartment door pivotally arranged on said cargo-compartment opening frame.

BACKGROUND

In particular in modern means of transport, be it aircraft, railways, ships or the like, complex door systems are used which ensure simple operability while at the same time providing good reliability and robustness vis-à-vis environmental influences. Thus, many commercial aircraft comprise, for example, cargo compartments of substantial size, which cargo compartments have generously dimensioned access openings that are closed by a correspondingly designed door. Due to extreme operating conditions with high pressure differentials and temperature differentials during an entire flight mission, safe locking of the door must be ensured. For this purpose, such cargo compartment doors frequently comprise locking devices that carry out automatic locking of the cargo door on a cargo-compartment opening frame.

In order to detect the point in time at which a cargo door during the closing movement from a fully open state, for example a pivoted open state, to a closed state is in a predetermined closing state that requires activation of the locking mechanism, and corresponding sensors are used. It has been shown that, in particular, inductive proximity switches are suitable for this task, because triggering a switching signal does not depend on a mechanically movable component that is subjected to wear and tear and to dirt build-up. A proximity switch is a limit switch that operates in a contactless manner, whose activation takes place by a measuring plate that is moved in proximity to an active surface of the proximity switch. In this type of proximity switch, care must be taken, in particular, that a specified measuring distance between the proximity sensor and the measuring plate for the reliable triggering of a closing signal at a precisely predeterminable point is attained.

In the conventional use of a proximity switch for registering the closing state of a cargo door, normally the approximation of the cargo door to a cargo-compartment opening frame is acquired, and thereupon the locking mechanism is activated. In order to improve the locking mechanism, there is, however, a desire to obtain a signal relating to the imminent closing already in a predetermined region prior to attaining complete closure. However, may make it impossible for the usual use of a proximity switch, for example at the free end of a pivotally held cargo door, because the measuring distance between the proximity switch and the measuring plate for successfully triggering a closing signal may be very short. A signal may only be emitted when the proximity switch and the measuring plate approach each other to one millimeter or a few millimeters.

SUMMARY

The use of mechanical switches which, for example, instead of being arranged at the free end of a closure element are arranged in closer proximity to a pivot axis or the like, which would be practical with a view to early detection of a closing state, may not be sensible, due to wear and tear and the potential susceptibility to dirt build-up.

It may thus be desirable to have a device for the early registration of the closing state of a closure element for a compartment opening, which device is to the largest possible extent wear-resistant and resistant to dirt build-up. It may be advantageous that this device is suitable for detecting an indirectly or directly upcoming closure element, or to detect any failure to reach a specified distance between a free end of a pivotally held closure element and an end position.

According to a first embodiment of the invention, the device comprises at least one inductive proximity sensor, at least one measuring plate and at least one movement path guide, wherein the inductive proximity sensor is arranged in an edge region adjacent to the compartment opening, wherein the measuring plate, by means of the movement path guide, is arranged at a corresponding edge region of the closure element, and wherein the movement path guide is equipped, from a predetermined degree of closing to complete closure of the closure element, to guide the measuring plate parallel to the proximity sensor.

In this arrangement, the term "movement path" can be interpreted as a continuous sequence of points where the measuring plate stays during the closing movement of the closure element, which sequence depends on geometric parameters, for example the length of a pivot axis, the position and design of the closure element in a closing region, and the like. The movement path guide is thus used to guide the measuring plate, which is held on a region of a closure element that travels along a movement path, along a path that is always parallel to the proximity sensor on an edge region of the compartment opening.

It goes without saying that it is also possible for the proximity sensor to be affixed to the closure element, and for the device to be affixed to the edge region of the compartment opening.

Any kind of door, gate, cover or the like, by means of which an opening may be closed, can be considered a closure element.

Such a design may provide a particular advantage in that even in the case of early acquisition of the closing state the use of an inductive proximity switch is possible. The specified threshold value in the form of a distance between the free edge region of the closure element and a corresponding edge region adjacent to the compartment opening or in the form of a certain degree of closing can be specified by the path which the measuring plate by means of the movement path guide can travel along towards the outside from the closure element to the edge region of the compartment opening. In other words, with the use of the movement path guide, the measuring plate is deflected beyond the edge of the closure element so that an approaching proximity sensor first moves to close proximity of the measuring plate before reaching the closure element. If, for example, a specified minimum distance between the two edge regions is desired as a detection quantity, it is then only a matter of deflecting the measuring plate by this path.

When the measuring plate and the proximity sensor for triggering a signal approach one another, a locking device or the like can be activated and can, for approximately the remainder of the path to be travelled, take over the movement of the cargo door. In this arrangement, despite the movement path of the edge region of the closure element, the measuring plate is aligned parallel to an active surface of the proximity sensor. In the assumption according to which in the case of relatively large closure elements, shortly before a closing state is attained, only a straight-line movement of the free end of the closure element is carried out, it is sufficient to design the movement path guide as a parallel guide. In this arrangement the measuring plate moves in space relative to the closure element, without there being any change in the plane of inclination of said measuring plate, and over the contemplated region shortly before complete closure of the closure element is parallel to the proximity sensor.

In this manner it may be possible to obtain uniform signal quality along the entire path to be travelled, in which path the proximity sensor provides a signal relating to the closing state of the closure element, which signal quality significantly improves the precision of the device according to an embodiment of the invention. This makes it possible to very precisely specify a degree of closing or the like, from which point onwards a signal relating to the closure state is present. Due to the movement path guide, the signal is not "lost" along the last distance to be travelled, but instead, due to a constant measuring distance between the measuring plate and the proximity switch, is always completely maintained. Since the initial approach of the proximity sensor to the measuring plate takes place with the surfaces already aligned so as to be completely parallel to each other, precise functioning under all imaginable environmental conditions is to be expected.

An embodiment of the device according to the invention comprises a retaining element that is equipped to deflect the measuring plate in the direction of the proximity sensor. In this manner the retaining element may ensure constant operational readiness of the proximity sensor because the movement path guide automatically deflects the measuring plate when opening of the closure element, at least to the specified end point. Various devices can be used as retaining elements, which devices automatically push the measuring plate in a specified direction, for example spiral springs, coil springs, gas pressure elements and the like.

In an embodiment of the device according to the invention, the movement path guide is designed as a crank with a first link, a second link and a third link, wherein the first and the second links are hinged to an attachment surface in the region of the compartment opening, thus forming a trapezoid or a parallelogram with the third link, and wherein the measuring plate is arranged on the third link. In this way a four-link chain is proposed by means of which a mechanically particularly simple, robust and reliable movement path guide of the measuring plate can be ensured.

Another embodiment of the device according to the invention further comprises an adjustable end stop device for limiting the deflection of the movement path guide. By means of simple adjustability, for example by means of adjustment screws or holding pins, in a very simple manner an early closure state or a threshold value to be acquired can be adjusted, from which state or value a closing signal is generated.

Another embodiment improvement of the device according to the invention further comprises a spacer to specify a defined distance between the measuring plate and the proximity sensor in the region between the predetermined degree of closing and the complete closure of the closure element. By means of the spacer it is possible to individually react to the technical data of the proximity sensor so that, taking into account control curves or the like; very high precision in the acquisition of the closing state can be achieved.

According to another embodiment of the invention a closure device for a cargo compartment that can be closed by means of a cargo door is provided, wherein the cargo compartment is accessible by means of a compartment opening, the compartment opening is surrounded by a cargo-compartment opening frame, and the cargo door is pivotally arranged on the cargo-compartment opening frame. In order to acquire the closing state, an inductive proximity sensor, at least one measuring plate and at least one movement path guide can be used, as explained in detail above.

Particularly advantageously, the vehicle comprises at least one control unit that is designed, when a specified activation distance between the edge surface of the compartment opening frame and the edge surface of the cargo door has been reached or has been under-run, to activate a locking mechanism.

Furthermore, the use of a device according to an embodiment of the invention in an aircraft, and an aircraft are provided, the aircraft comprising at least one cargo compartment, which can be opened or closed by a cargo door, wherein a device according to an embodiment of the invention is used to acquire the closing state of the cargo door.

BRIEF DESCRIPTION OF THE DRAWINGS

Further characteristics, advantages and application options of the present invention are contained in the following description of the exemplary embodiments and the figures. In this arrangement all the described and/or illustrated characteristics per se and in any combination form the subject of the invention, even irrespective of their composition in the individual claims or their interrelationships. Furthermore, identical or similar objects in the figures have the same reference characters.

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
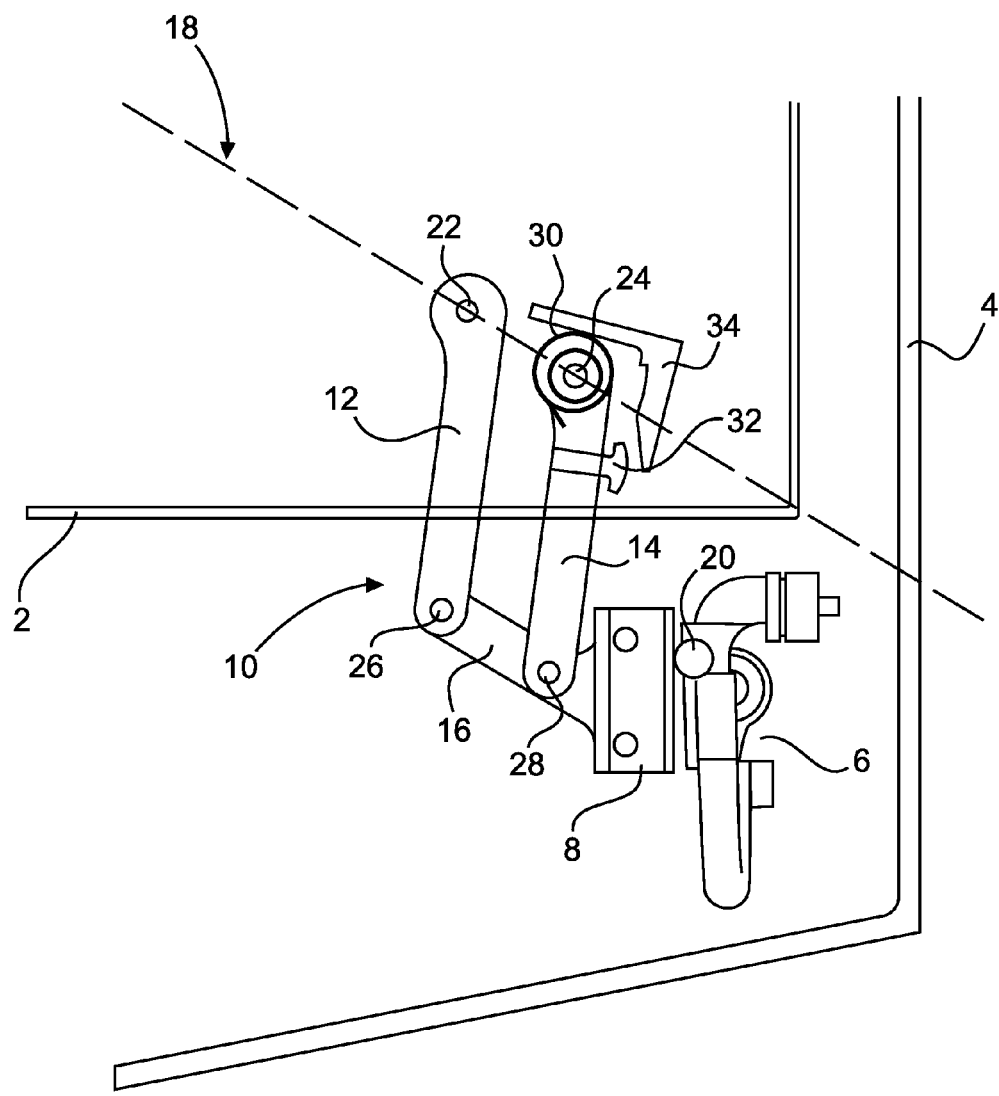
FIG. 1 shows a schematic representation of the device according to an exemplary embodiment of the invention.

FIG. 1 shows a schematic representation of a cargo-compartment opening frame 4, a cargo door 2, a proximity sensor 6, a measuring plate 8 and a movement path guide 10, designed as a parallel guide, comprising a first element (also described as link) 12, a second element (or link) 14 and a third element (or link) 16, on which the measuring plate 8 is arranged. The dashed line shows a movement path (door opening curve) 18 which in the region around the closing state of the cargo door 2 in the case of particularly large cargo doors 2 can be approximated with a straight line. In the illustration shown, the measuring plate 8 approaches the proximity sensor 6 by way of a spacer 20 that is used to adjust the implementation of the combination comprising the measuring plate 8 and the proximity switch 6 to the switching curves of the manufacturer of the proximity sensor 6. Here, usually a reference measuring-distance is stated, which in the present embodiment is continuously maintained by means of the spacer 20.

By way of the three elements 12, 14 and 16 in combination with a first hinge joint 22, a second hinge joint 24, a third hinge joint 26 and a fourth hinge joint 28, the movement path guide 10 forms a four-link chain. In the design of this four-link chain, in which the first element 12 and the second element 14 are aligned so as to be parallel to one another, in other words form a parallelogram, the spatial orientation of the measuring plate 8 remains constant over wide regions or completely. If the cargo door 2 were to open towards the left-hand side in the drawing plane, the measuring plate 8 would be driven by a retaining element 30 in the form of a spiral spring, which as an example is arranged on the second hinge joint 24 and which deflects the second element 14 counter clockwise. In this arrangement the spatial orientation of the measuring plate 8 always remains as shown in FIG. 1 so that when a straight-line movement of a free end of the cargo door 2 is assumed the proximity sensor 6 and the measuring plate 8 are always arranged so as to be parallel to each other. This may make possible a strict alignment according to the control curve of the manufacturer of the proximity sensor 6, and the precision of acquiring the closing state of the cargo door 2 is considerably improved.

In order to set the distance at which the measuring plate 8 can be deflected to the right-hand side in the drawing plane, which corresponds to the start of the switching signal or the degree of closing, which is to be stated, of the cargo door 2, an adjustable end stop 32 can be used, which comes to rest against an end stop surface 34. By adjusting the end stop device 32, for example by screwing it in or out, the degree of closing, which is to be acquired, of the cargo door 2 can be determined.

Figures 2A, 2B:
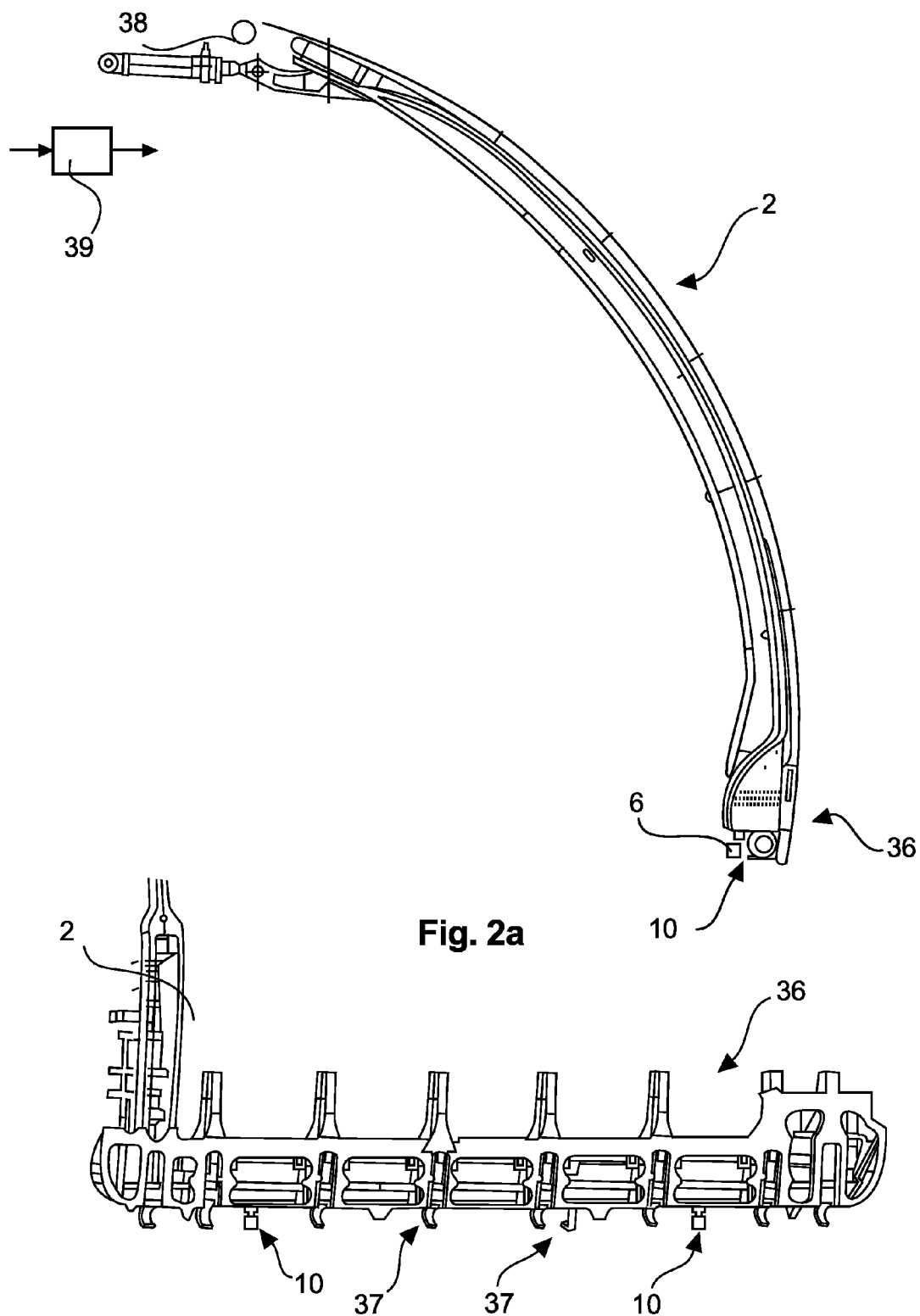
FIG. 2a and FIG. 2b show a cargo door for a cargo compartment of an aircraft with the installation position of a proximity sensor and the device according to an exemplary embodiment of the invention.

The proximity sensor 6 according to FIG. 2a, corresponding to a lower edge region 36 of the cargo door 2 arranged on a pivot axis 38, is arranged on the cargo-compartment opening frame 4 (for the sake of simplicity not shown) because at this position particularly precise acquisition of the degree of closing is made possible. A control unit 39, shown as an example, is connected to the proximity sensor 6 and can activate a locking mechanism 37, shown in FIG. 2b, which locks the cargo door 2 in a closed position.

FIG. 2b shows the lower edge region 36 of the cargo door 2 in a three-dimensional illustration in order to show the exemplary attachment positions of the device 10 according to the invention. As shown in the illustration, in order to detect the closing state of the cargo door 2 it is also possible to simultaneously use several devices 10 according to the invention.

Figure 3:
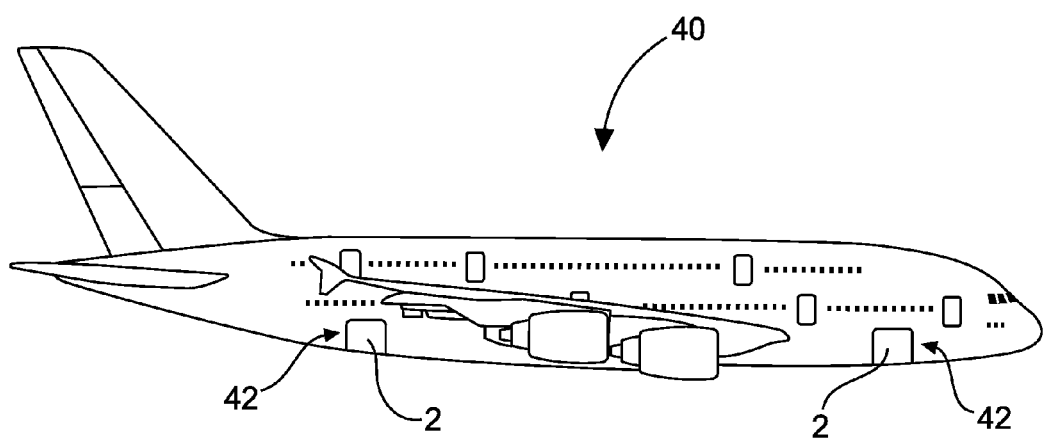
FIG. 3 shows an aircraft with at least one cargo compartment, a cargo compartment door and a device according to an exemplary embodiment of the invention.

Finally, FIG. 3 shows an aircraft 40 comprising at least one cargo compartment 42 and a cargo door 2. According to the above-mentioned technical characteristics and advantages, the device according to the invention can be used for the early acquisition of a closing state.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A device for early registering of a closing state of a closure element for a compartment opening, comprising:
    at least one inductive proximity sensor;
    at least one measuring plate; and
    at least one movement path guide,
    wherein the inductive proximity sensor and the measuring plate are arranged at regions of the closure element which are opposite a closing region of the closure element and wherein the inductive proximity sensor and the measuring plate are arranged at a corresponding edge region adjacent to the compartment opening,
    wherein the movement path guide is designed to guide the measuring plate parallel to the proximity sensor from a predetermined degree of closing of the closure element to complete closure of the closure element, and
    wherein the measuring plate is movable between the corresponding edge region of the compartment opening and an edge of the closure element at least in the predetermined degree of closure of the closure element.

2. The device of claim 1, wherein the movement path guide comprises a retaining element that is designed to deflect the measuring plate in the direction of the proximity sensor.

3. The device of claim 1,
    wherein the movement path guide is designed as a linkage comprising a first element, a second element and a third element,
    wherein the first element and the second element are hinged to an attachment surface near the edge of the closure element and the first element and second element are each hinged to the third element, thus forming a trapezoid or a parallelogram with the third element, and
    wherein the measuring plate is arranged on the third element so as to be substantially parallel to at least one of the first element and the second element.

4. The device of claim 1, further comprising an adjustable end stop device for limiting the deflection of the movement path guide.

5. The device of claim 1, further comprising a spacer to specify a defined distance between the measuring plate and the proximity sensor in a region between the predetermined degree of closing and the complete closure of the closure element.

6. A closure device for a cargo compartment of an aircraft, comprising
    a cargo-compartment opening frame;

a cargo door pivotally held to the cargo-compartment opening frame, comprising a pivot axis and an edge region, arranged on an opposite end of the cargo door;

at least one inductive proximity sensor that measures a proximity of the cargo door to the cargo-compartment opening frame;

at least one measuring plate; and at least one movement path guide having at least one hinge that couples the at least one movement path guide to the cargo door, wherein the inductive proximity sensor is arranged in an edge region of the cargo-compartment opening frame, which edge region corresponds to the edge region of the cargo door, wherein the measuring plate is coupled to the edge region of the cargo door by the movement path guide so as to be movable relative to the cargo door about the at least one hinge, and wherein the movement path guide is designed to guide the movement of the measuring plate parallel to the proximity sensor from a predetermined space between the edge region of the cargo door and the corresponding edge region of the cargo-compartment opening frame to complete closure of the cargo door.

7. The closure device of claim 6, further comprising at least one control unit that is equipped, when a specified activation distance between the edge region of the cargo door and the corresponding edge region of the cargo-compartment opening frame has been reached or has been exceeded, to activate a locking mechanism.

8. An aircraft, comprising at least one cargo compartment and at least one cargo door that close off the cargo compartment, and a locking mechanism, comprising:

a cargo-compartment opening frame;

a cargo door pivotally held to the cargo-compartment opening frame, comprising a pivot axis and an edge region, arranged opposite the pivot axis;

at least one inductive proximity sensor, at least one measuring plate, and at least one movement path guide, wherein the inductive proximity sensor is arranged in an edge region of the cargo-compartment opening frame, which edge region corresponds to the edge region of the cargo door, wherein the movement path guide movably couples the measuring plate to the edge region of the cargo door, and wherein the movement path guide guides the movement of the measuring plate parallel to the proximity sensor from a predetermined space between the edge region of the cargo door and the corresponding edge region of the cargo-compartment opening frame to complete closure of the cargo door, such that the measuring plate is movable between the edge region of the cargo-compartment opening frame and the edge region of the cargo door.

* * * * *